United States Patent [19]

Yoder

[11] 4,403,468
[45] Sep. 13, 1983

[54] SWATH TURNING MACHINE

[76] Inventor: Kermit L. Yoder, R.D. 1, Box 174, Accident, Md. 21520

[21] Appl. No.: 387,042

[22] Filed: Jun. 10, 1982

[51] Int. Cl.³ ............................................. A01D 79/00
[52] U.S. Cl. .......................................... 56/370; 56/377
[58] Field of Search ................. 56/372, 376, 377, 370, 56/364, 365, 366, 192

[56] References Cited

U.S. PATENT DOCUMENTS

| | | | |
|---|---|---|---|
| 522,659 | 7/1894 | Harmon | |
| 937,076 | 10/1909 | Kobelanz | |
| 1,047,147 | 12/1912 | Bamford | |
| 1,166,136 | 12/1915 | Leasure | |
| 1,239,153 | 9/1917 | Bamford | |
| 1,687,310 | 10/1928 | Randall | |
| 2,068,092 | 1/1937 | Synck | 56/376 |
| 2,529,577 | 11/1950 | Schempp et al. | 56/370 |
| 2,609,651 | 9/1952 | Cymara | 56/370 |
| 2,629,223 | 2/1953 | Russell | 56/376 |
| 2,636,335 | 4/1953 | Whitney | 56/370 |
| 2,667,731 | 2/1954 | Nerness | 56/372 |
| 2,679,720 | 6/1954 | Cymara | 56/370 |

Primary Examiner—Jay N. Eskovitz
Attorney, Agent, or Firm—Douglas N. Larson

[57] ABSTRACT

A swath turning machine having a frame with a first edge and a second edge and wheels rotatably attached to the frame so that the frame can be pulled by a tractor in a direction of travel. A pick-up device is disposed along the first edge which engages swaths of hay lying on the ground and deposits them on the frame. An endless belt connected to the frame moves the swaths from the first edge of the frame to the second edge. The second edge is spaced above the ground and defines an obtuse angle with the direction of frame travel. A turning device moves the swaths in a direction generally perpendicular to the direction of frame travel from the second edge to the ground, turning the swaths over, so that the underside can be quickly dried, as the frame is pulled by the tractor.

27 Claims, 17 Drawing Figures

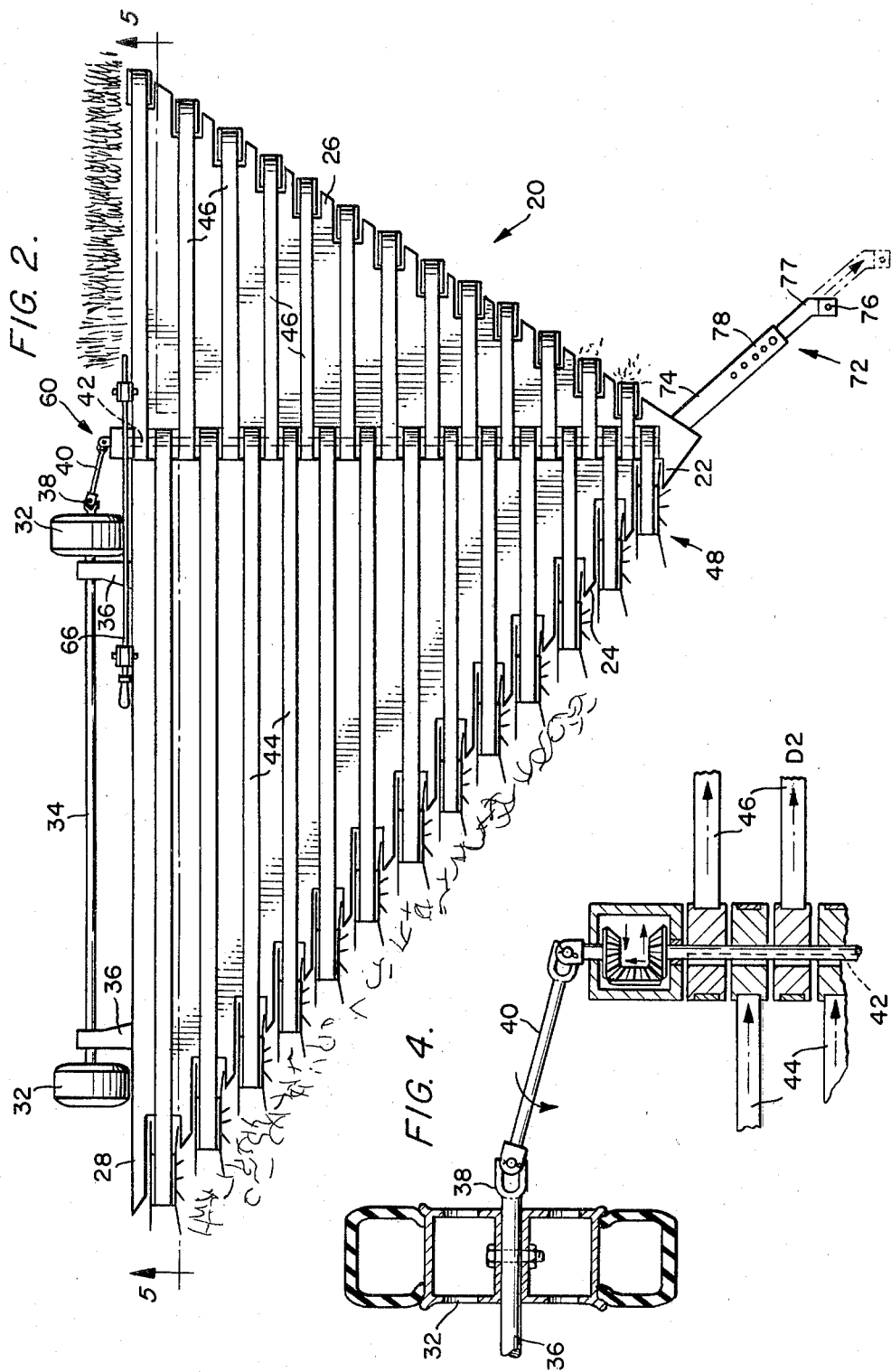

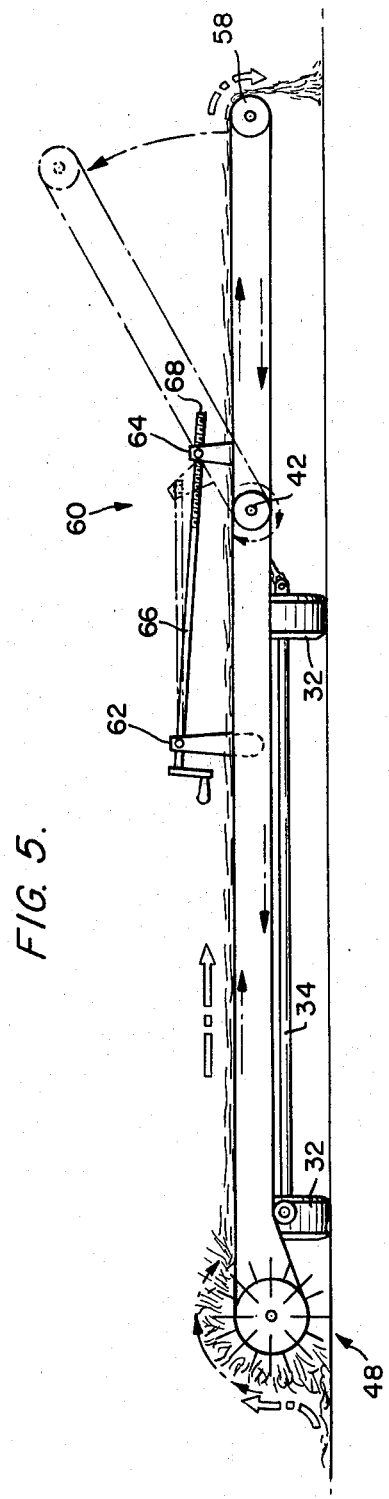
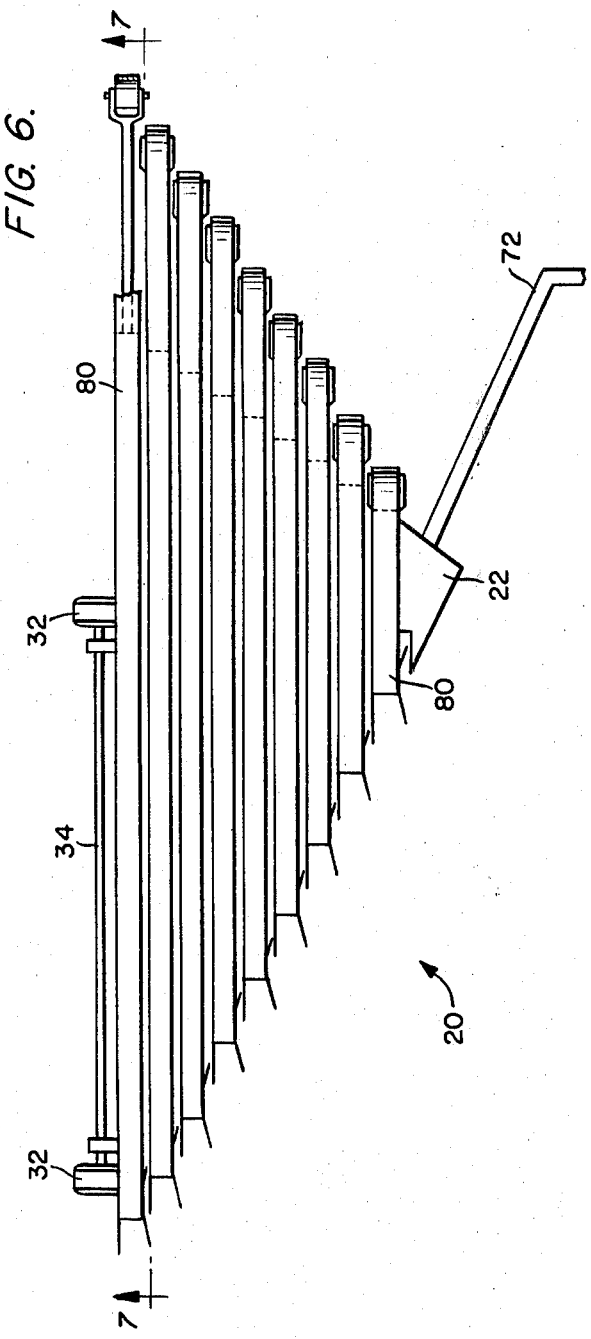

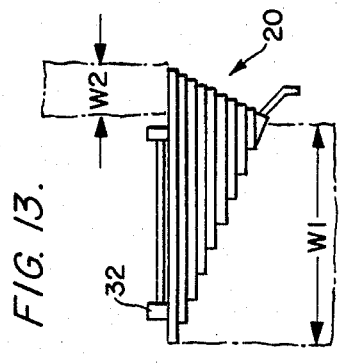
FIG. 11.
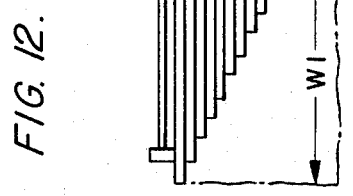
FIG. 12.
FIG. 13.
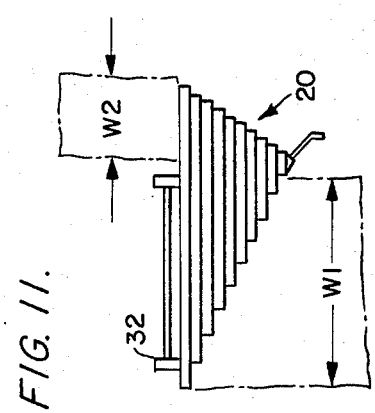
FIG. 14.
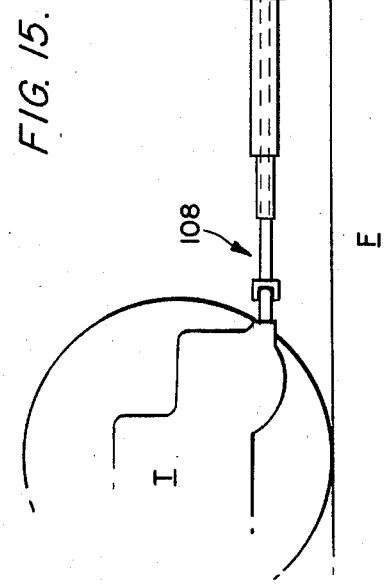
FIG. 15.

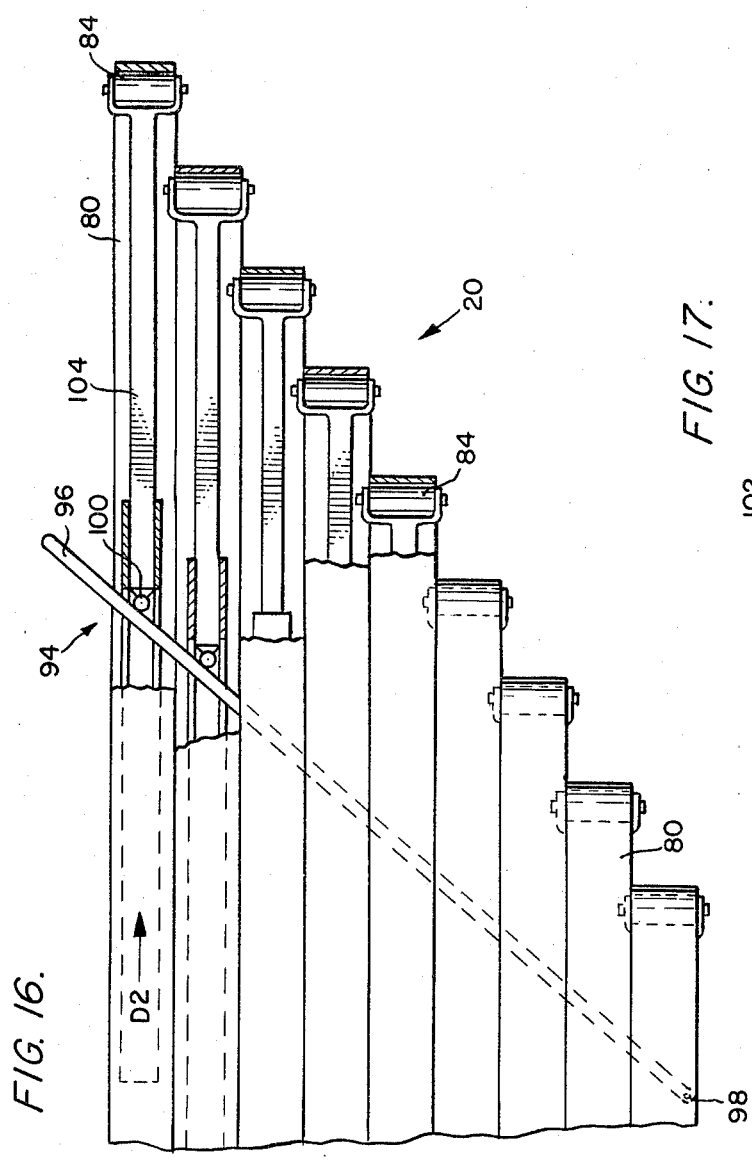
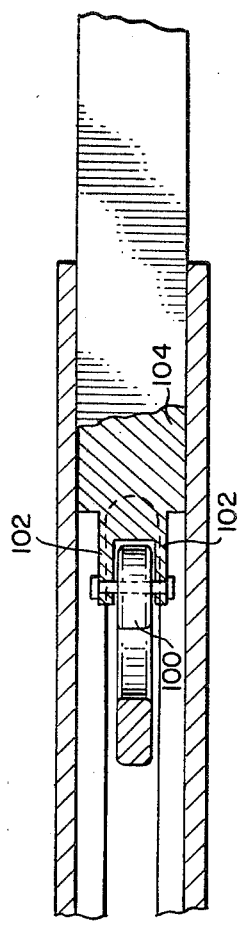

SWATH TURNING MACHINE

FIELD OF THE INVENTION

This invention relates to farm equipment and more particularly to farm equipment used in the harvesting of hay. It further relates to farm machinery which can be pulled by a tractor or similar automotive means in a field of cut hay, the equipment turning the hay over so that its underneath side can be dried as well.

SUMMARY OF THE INVENTION

The present invention illustrates a novel machine which turns swaths of hay over in the field so that they can be dried on their underneath side. The swaths are first picked up along one edge of the machine and deposited thereon. The swaths of hay are then moved to a second frame edge in a direction generally perpendicular to the direction of travel of the machine. This second edge of the frame is positioned so that it defines an obtuse angle with the direction of travel of the device. Means along the second edge then place the hay on the ground. Because of the angle of the second edge and the movement of the frame in its direction of travel, the hay is folded or flipped underneath the second edge thereby turning the swaths completely over. The angle defined by the second edge can be varied so that the width of the output swath is varied for ease in baling. The pulling or automotive means for the frame is offset from the first edge so that the pulling means does not run over and thereby damage the cut hay.

BACKGROUND OF THE INVENTION

In the past, hay was cut in the field and left to dry. When dried sufficiently it can then be baled. The timing can be critical in that the hay must be cut at a certain time when it has reached a certain stage of development, and then it must be dried in the field sufficiently and thoroughly enough for it to be ready for baling. The farmer does not want the cut hay left too long in the field as it dries because this can occupy valuable field time and possibly result in fewer crops being harvested in one season. It is also important that the hay once cut be baled before the next rain. Otherwise, the hay can be ruined or at least an even longer drying time is required.

Various farm implements have been used to shorten the field drying time. For example, hay tedders have been used which essentially stir or mix the hay up as it lies on the ground. They do not turn the hay over completely for maximum drying. Hay rakes also have been used to turn the hay over, but then only partially over. These rakes or similar rakes also are used to gather the cut hay into windrows. These raked windrows or swaths should be of a convenient width for ease in baling. Neither the rakes nor the tedders have proven to be satisfactory though for a number of reasons. First, they do not completely turn the hay over so that it can dry in the shortest time period. Second, they do not work as cleanly as desired, in other words, they roll up more trash, rocks, and other debris and mix it in with the hay, especially if forage is cut with a forage harvester for filling a silo. Third, these prior devices usually are designed so that the pulling implement, typically a tractor, runs over the hay thereby crushing it and knocking off the protein-laden leaves, which is undesirable. Fourth, these devices typically do not place the hay in swaths of predetermined desired widths to maximize the efficiency of the baling machines, especially for the four and five foot round hay balers.

OBJECTS OF THE INVENTION

Accordingly, it is the principal object of the present invention to provide a means for farmers to shorten the time required for cut hay to dry in the fields.

Another object of the present invention is to provide a device which is simple of construction and can readily be attached to existing tractor and other automotive means for completely turning cut swaths of hay over in the field so that they may dry completely on both the top and the bottom.

A further object of the present invention is to provide a device which aids in the harvesting of hay but causes little damage to the hay through the crushing the hay or knocking any of its leaves off.

A still further object of the present invention is to provide a device which places cut swaths of hay in a desired windrow width.

Another object of the present invention is to provide a device which handles hay cleanly by mixing in only a minimum of dirt, trash and other undesirable matter.

Other objects and advantages of the present invention will become more apparent to those persons having ordinary skill in the art to which the present invention pertains from the following description taken in conjunction with the accompanying drawings.

THE DRAWINGS

FIG. 2 is an enlarged top plan view of the machine of FIG. 1.

FIG. 4 is a fragmentary, partially broken away, top plan view of the driving connection means between the wheels and the belt drive axle of the machine of FIG. 2.

FIG. 5 is a cross-sectional view taken along line 5—5 of FIG. 2 wherein the machine is illustrated in phantom lines in its folding position.

FIG. 6 is a top plan view of a second embodiment of the present invention.

FIGS. 11 through 13 are top plan views of the machine of FIG. 6 illustrating some of the different widths of output windrows.

FIG. 14 is a top plan view of the machine of FIG. 6 illustrating an optional transporting model.

FIG. 15 is a side elevational view of the machine of FIG. 6 illustrating the machine connected to the power takeoff means of a tractor.

FIG. 16 is a fragmentary, partially broken away, top plan view of another embodiment of the present invention similar to that of FIG. 6.

FIG. 17 is a fragmentary, partially broken away view of one of the adjustment means illustrated in FIG. 16.

THE PREFERRED EMBODIMENTS

Figure 1:
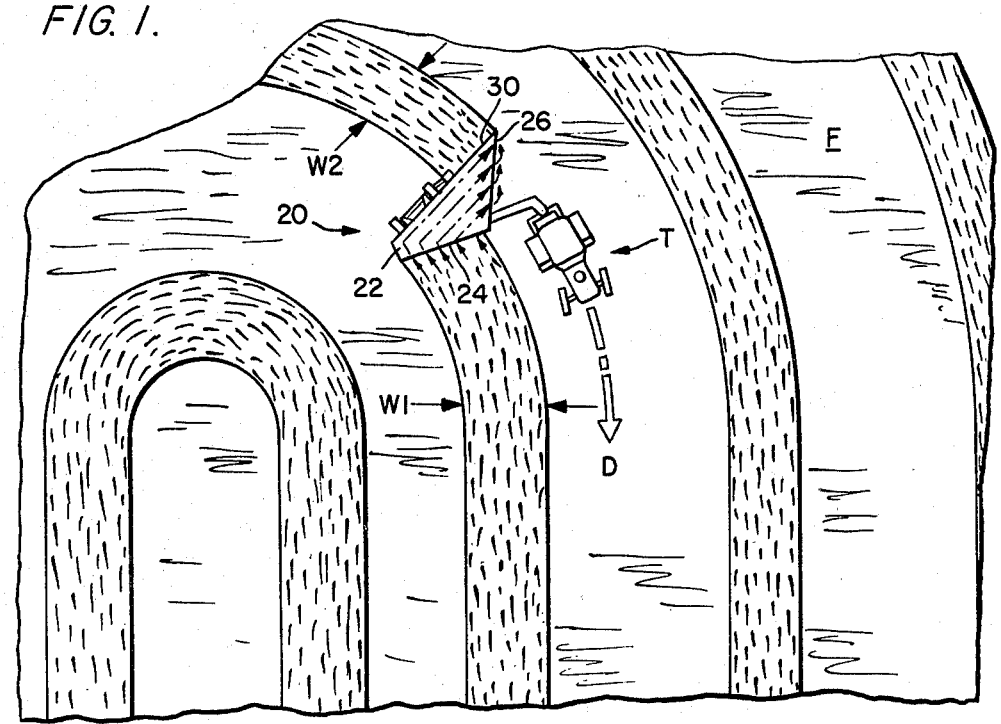
FIG. 1 is a top plan view illustrating one embodiment of the present invention in use in a field.

Referring to the drawings, there is illustrated an embodiment of the invention in a machine shown generally at 20. It is shown in use in a field F in FIG. 1 and being pulled by a tractor T in a direction D. Machine 20 includes a frame 22 defining a generally triangular shape having a first edge 24, which defines an obtuse angle A with direction D, a second edge 26, and a third edge 30. As best shown in FIG. 1, edge 24 engages a swath of hay having a width W1 picks this swath up and moves it in a direction D2, which is generally perpendicular to direction D, to and over edge 26. Since edge 26 defines an obtuse angle as shown by angle B in FIG. 2, relative to direction D and since frame 22 and thus edge 26 are being pulled by tractor T in direction D the swath is flipped or turned over under second edge 26 and into a windrow having a width W2. By varying the angle that edge 26 defines in relation to direction D width W2 can be varied, as described in detail later, and which is best shown in FIGS. 11 through 13. Thus, width W2 can be varied to accommodate different round balers.

Referring to FIG. 2, one embodiment of the present invention is shown in greater detail. As shown therein, a pair of wheels 32, are mounted on axle 34 which is rotatably attached to frame 30 by mounting members 36, 36 along edge 28. At end 38 of axle 34 a universal connection shaft 40 is connected which drivingly connects belt drive shaft 42 to axle 34, as best shown in FIG. 4. Thus, as frame 30 is pulled by tractor T, wheels 32 cause axle 34 to rotate. The rotation of axle 34 rotates belt drive shaft 42 through universal connection shaft 40.

Two sets of alternating belts 44 and 46 are driven by shaft 42, as shown in FIGS. 2 and 4. Belts 44 and 46 move from first edge 24 to second edge 26 in a direction D2. These belts thus move hay continuously between the first and the second edges across the frame, as shown by the arrows in FIGS. 1 and 5.

Figure 3:
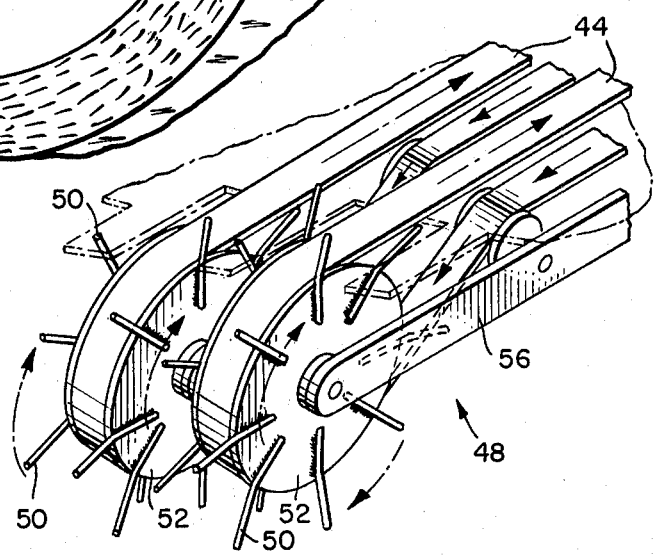
FIG. 3 is a fragmentary perspective view of the pick-up means of the machine of FIG. 1.

At the edge of belts 44 along edge 24 is a pick-up device shown generally at 48. Referring to FIG. 3, it is seen that pick-up device 48 comprises a plurality of teeth 50 positioned on either sides of wheels 52. Thus belt 44 guided over roller 54 reeves around wheel 52 thereby rotating wheel 52. As wheel 52 rotates, teeth 50 engage cut hay and lift and deposit it on belts 44. Any conventional type of hay pick-up devices can be used including spring-loaded teeth means whereby the teeth retract when they engage a rock or similar hard substance so that they are not thereby damaged or broken off. As shown in FIG. 3, wheels 52 are rotatably attached by bars 56 positioned on either sides thereof and mounted on frame 22.

Belts 46 comprise a continuous belt means driven at one edge by drive shaft 42 and connected to the other end on wheels 58 rotatably mounted to the frame along edge 26. Thus, as the hay is picked up by pick-up device 48 deposited on belts 44 moved thereby to belts 46 it is deposited on the ground by belts 46 along edge 26.

The embodiment of FIG. 2 also includes a folding mechanism shown generally at 60. As best shown in FIG. 5, folding mechanism 60 includes a pair of brackets 62, 64 and a shaft 66 rotatably mounted therebetween. Shaft 66 has a screw portion 68 adjacent bracket 64 whereby, when handle 70 is turned, shaft 66 turns thereby screwing bracket 64 along shaft 66. As shown in the phantom lines of FIG. 5, folding mechanism 60 lifts edge 26 up and towards edge 24 pivoting it about drive shaft 42. In the folded position, machine 20 is narrower thereby facilitating transport of the swath turning machine to and from field F along narrow roads.

Referring to FIG. 2, it is seen that the present invention also includes a tractor connecting tongue shown generally at 72. Tongue 72 is mounted at one end 74 to frame 22 and at the other end has an aperture 76 for securing to tractor T. As shown in the phantom lines, tongue 72 includes a portion 77 which is slidably adjustable in the hollow fixed portion 78. This allows for an adjustment of the relative positioning of the frame and the tractor in both directions D and D2.

The tongue is diagonally disposed between the frame and the tractor so that they travel parallel, but nonintersecting paths. Thus, the machine, as best shown in FIG. 1, can then follow an inwardly-spiralling path in the field thereby minimizing the amount of cut hay that tractor T runs over.

Figure 7:
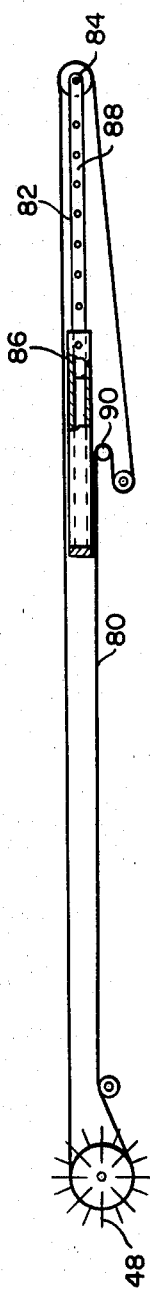
FIG. 7 is a cross-sectional view taken along line 7—7 in FIG. 6.
Figure 8:
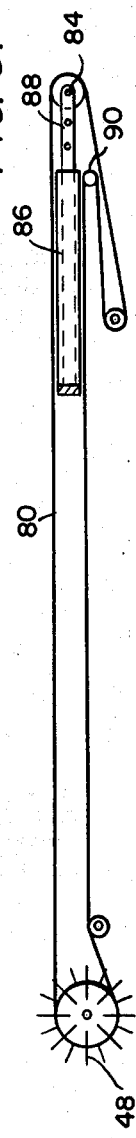
FIG. 8 is a view similar to FIG. 7 wherein the belt has been adjusted to a shorter position.
Figure 9:
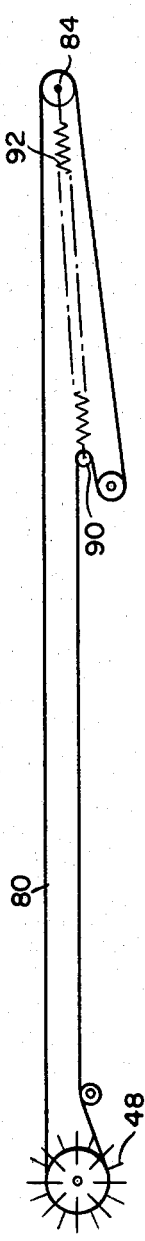
FIG. 9 is a view similar to FIG. 7 wherein another embodiment of the present invention is illustrated using a spring adjustment mechanism.
Figure 10:
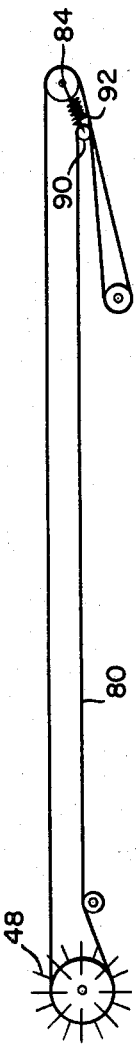
FIG. 10 is a view similar to FIG. 9 illustrating the belt means in a shortened position.

FIG. 6 illustrates another embodiment of the present invention. A plurality of parallel belts 80 extending between the first edge and the second edge are provided therein. The length of the belts can be adjusted by any conventional means. One method is illustrated in FIGS. 7 and 8 wherein the mounting brackets 82 for the wheels 84 have adjustable lengths. The means used here is similar to the means for the adjustable tongue of FIG. 2. The mounting brackets 82 include a fixed portion 86 having a hollow center in which member 88 can slide. Member 88 includes a plurality of holes which can be aligned with the hole in member 86 and a pin or similar means inserted therethrough thereby securing member 88 to member 86 for the desired length of member 88. As shown in FIG. 8, the slack in the belt is taken up by a movable roller 90. The method of FIGS. 9 and 10 uses a spring means shown generally at 92 connecting wheel 84 and roller 90. Thus, the belt is kept in constant tension. Wheel 84 is movable between positions shown in FIGS. 9 and 10 and there are means (not shown) along second edge 26 for securing wheel 84 to frame 22.

FIG. 16 illustrates a handle adjustment device shown generally at 94 for positioning wheels 84 in a straight line. Device 94 includes a stick 96 pivotally secured to the frame at end 98 and engaging rollers 100 rotatably mounted between brackets 102, 102 at an end of member 104. Wheels 84 are rotatably mounted at the opposite end of member 104. Thus, as stick 96 is moved manually or by mechanical means (not shown) about pivot end 98, rollers 100 and thus members 104 are moved in direction D2. A locking means (not shown herein) can then secure stick 96 in its desired position.

Thus, by any of the means shown herein, for example, those of FIGS. 6 through 10 or 16 through 17, the positions of the wheels 84 and thus edge 26 can be adjusted. As edge 62 is moved the angle defined between the edge and the direction of travel D is varied. As best shown in FIGS. 11 through 13, the width W2 of the output swath is thereby adjusted. This allows for the variable field or baler requirements.

A device mounted underneath the frame and illustrated generally in FIG. 14 is also contemplated by the present invention. This device allows the wheels to be rotated to a position so that the device can be pulled in direction D3 by frame arm 106 for easier transport on the highways. This is advantageous since frame 22 is narrower in this direction.

The present invention also contemplates a power take-off means from tractor T shown generally at 108 in FIG. 15 for directly driving the drive shaft of the swath turning machine from the tractor, in lieu of the wheel-driven means of FIG. 4.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A swath turning machine comprising:
   a frame including a first edge and a second edge,
   a wheel means rotatably attached to said frame whereby said frame can be moved in a first direction of travel,
   a pick-up means disposed along said first edge for engaging swaths lying on the ground and depositing said swaths on said frame,
   a moving means connected to said frame for moving said deposited swaths from said first edge to said second edge,
   said moving means moving the swaths between said first edge and said second edge in a direction perpendicular to said first direction of travel,
   said second edge being spaced above the ground,
   said second edge defining an obtuse angle with said direction of frame travel, and
   a turning means for moving said swaths in a direction generally perpendicular to said first direction of travel from said second edge to the ground, said turning means turning said swaths over as said frame moves in said first direction of travel and as said swaths are moved from said second edge to the ground.

2. The swath turning machine according to claim 1 including,
   said first edge and said second edge being positioned in the same horizontal plane.

3. The swath turning machine according to claim 1 including,
   said first edge defining an obtuse angle with said first direction of travel on the opposite side of said first direction of travel as said second edge.

4. A swath turning machine comprising:
   a frame including a first edge and a second edge,
   a wheel means rotatably attached to said frame whereby said frame can be moved in a first direction of travel,
   a pick-up means disposed along said first edge for engaging swaths lying on the ground and depositing said swaths on said frame,
   a moving means connected to said frame for moving said deposited swaths from said first edge to said second edge,
   said second edge being spaced above the ground,
   said second edge defining an obtuse angle with said direction of frame travel,
   said first edge and said second edge being positioned in the same horizontal plane, and
   a turning means for moving said swaths in a direction generally perpendicular to said first direction of travel from said second edge to the ground, said turning means turning said swaths over as said frame moves in said first direction of travel and as said swaths are moved from said second edge to the ground.

5. The swath turning machine according to claim 4 including,
   said first edge defining an obtuse angle with said first direction of travel on the opposite side of said first direction of travel as said second edge.

6. A swath turning machine comprising:
   a frame including a first edge and a second edge,
   a wheel means rotatably attached to said frame whereby said frame can be moved in a first direction of travel,
   a pick-up means disposed along said first edge for engaging swaths lying on the ground and depositing said swaths on said frame,
   a moving means connected to said frame for moving said deposited swaths from said first edge to said second edge,
   said second edge being spaced above the ground,
   said second edge defining an obtuse angle with said direction of frame travel,
   said first edge defining an obtuse angle with said first direction of travel on the opposite side of said first direction of travel as said second edge, and
   a turning means for moving said swaths in a direction generally perpendicular to said first direction of travel from said second edge to the ground, said turning means turning said swaths over as said frame moves in said first direction of travel and as said swaths are moved from said second edge to the ground.

7. The swath turning machine according to claim 6 including,
   a pulling means,
   a connecting means for connecting said frame to said pulling means such that said first edge is offset from said pulling means in said first direction of travel so that said first edge and said pulling means travel parallel, substantially nonintersecting paths.

8. A swath turning machine comprising:
   a frame including a first edge and a second edge,
   a wheel means rotatably attached to said frame whereby said frame can be moved in a first direction of travel,
   a pick-up means disposed along said first edge for engaging swaths lying on the ground and depositing said swaths on said frame,
   a moving means connected to said frame for moving said deposited swaths from said first edge to said second edge,
   said moving means moving the swaths, when approaching and adjacent to said second edge, in a direction generally perpendicular to said first direction of travel,
   said second edge being spaced above the ground,
   said second edge defining an obtuse angle with said direction of frame travel, and
   a turning means for moving said swaths in a direction generally perpendicular to said first direction of travel from said second edge to the ground, said turning means turning said swaths over as said frame moves in said first direction of travel and as said swaths are moved from said second edge to the ground, 9. A swath turning machine comprising:
   a frame including a first edge and a second edge, a wheel means rotatably attached to said frame whereby said frame can be moved in a first direction of travel, a pick-up means disposed along said first edge for engaging swaths lying on the ground and depositing said swaths on said frame, a moving means connected to said frame for moving said deposited swaths from said first edge to said second edge, said moving means moving the swaths between said first edge and said second edge along a straight line path, said second edge being spaced above the ground, said second edge defining an obtuse angle with said direction of frame travel, and a turning means for moving said swaths in a direction generally perpendicular to said first direction of travel from said second edge to the ground, said turning means turning said swaths over as said frame moves in said first direction of travel and as said swaths are moved from said second edge to the ground.

10. A swath turning machine comprising:

a frame including a first edge and a second edge, a wheel means rotatably attached to said frame whereby said frame can be moved in a first direction of travel, a pick-up means disposed along said first edge for engaging swaths lying on the ground and depositing said swaths on said frame, a moving means connected to said frame for moving said deposited swaths from said first edge to said second edge, said moving means moving the swaths in a single plane defined by said first edge and said second edge between said first edge and said second edge, said second edge being spaced above the ground, said second edge defining an obtuse angle with said direction of frame travel, and a turning means for moving said swaths in a direction generally perpendicular to said first direction of travel from said second edge to the ground, said turning means turning said swaths over as said frame moves in said first direction of travel and as said swaths are moved from said second edge to the ground.

11. The swath turning machine according to claim 10 including, said single plane being horizontally disposed.

12. A swath turning machine comprising:

a frame including a first edge and a second edge, a wheel means rotatably attached to said frame whereby said frame can be moved in a first direction of travel, a pick-up means disposed along said first edge for engaging swaths lying on the ground and depositing said swaths on said frame, a moving means connected to said frame for moving said deposited swaths from said first edge to said second edge, said second edge being spaced above the ground, said second edge defining an obtuse angle with said direction of frame travel, said second edge having a forward end and a rearward end, said moving means moving the swaths over said second edge between and adjacent said forward end and said rearward end, said forward end being disposed in the same horizontal plane as said rearward end, and a turning means for moving said swaths in a direction generally perpendicular to said first direction of travel from said second edge to the ground, said turning means turning said swaths over as said frame moves in said first direction of travel and as said swaths are moved from said second edge to the ground.

13. A swath turning machine comprising:

a frame including a first edge and a second edge, a wheel means rotatably attached to said frame whereby said frame can be moved in a first direction of travel, a pick-up means disposed along said first edge for engaging swaths lying on the ground and depositing said swaths on said frame, a moving means connected to said frame for moving said deposited swaths from said first edge to said second edge, said moving means including a belt system, said belt system including a plurality of parallel belts, each of said belts moving in a single vertical plane and extending between said first edge and said second edge, said second edge being spaced above the ground, said second edge defining an obtuse angle with said direction of frame travel, and a turning means for moving said swaths in a direction generally perpendicular to said first direction of travel from said second edge to the ground, said turning means turning said swaths over as said frame moves in said first direction of travel and as said swaths are moved from said second edge to the ground.

14. A swath turning machine comprising:

a frame including a first edge and a second edge, a wheel means rotatably attached to said frame whereby said frame can be moved in a first direction of travel, a pick-up means disposed along said first edge for engaging swaths lying on the ground and depositing said swaths on said frame, a moving means connected to said frame for moving said deposited swaths from said first edge to said second edge, said moving means moving the entire swath picked up by said pick-up means at the same angle away from said first edge toward said second edge, said second edge being spaced above the ground, said second edge defining an obtuse angle with said direction of frame travel, and a turning means for moving said swaths in a direction generally perpendicular to said first direction of travel from said second edge to the ground, said turning means turning said swaths over as said frame moves in said first direction of travel and as said swaths are moved from said second edge to the ground.

15. A swath turning machine comprising:

a frame including a first edge and a second edge, a wheel means rotatably attached to said frame whereby said frame can be moved in a first direction of travel, a pick-up means disposed along said first edge for engaging swaths lying on the ground and depositing said swaths on said frame, a moving means connected to said frame for moving said deposited swaths from said first edge to said second edge, said second edge being spaced above the ground, said second edge defining an obtuse angle with said direction of frame travel, and a turning means driven by said moving means for moving said swaths in a direction generally perpendicular to said first direction of travel from said second edge to the ground, said turning means turning said swaths over as said frame moves in said first direction of travel and as said swaths are moved from said second edge to the ground.

16. The machine according to claim 15 including, said moving means comprising a movable belt means.

17. The machine according to claim 15 including, said moving means comprising a movable chain means.

18. The machine according to claim 15 including, said moving means being driven by said wheel means.

19. A swath turning machine comprising:

a wheel means rotatably attached to said frame whereby said frame can be moved in a first direction of travel, a pick-up means disposed along said first edge for engaging swaths lying on the ground and depositing said swaths on said frame, a moving means connected to said frame for moving said deposited swaths from said first edge to said second edge, said moving means comprising a first moving means, a second moving means, and a drive shaft driving said first and second moving means, said first moving means driving said pick-up means, and said second driving means driving said turning means, said second edge being spaced above the ground, said second edge defining an obtuse angle with said direction of frame travel, and a turning means for moving said swaths in a direction generally perpendicular to said first direction of travel from said second edge to the ground, said turning means turning said swaths over as said frame moves in said first direction of travel and as said swaths are moved from said second edge to the ground.

20. A swath turning machine comprising:

a wheel means rotatably attached to said frame whereby said frame can be moved in a first direction of travel, a pick-up means disposed along said first edge for engaging swaths lying on the ground and depositing said swaths on said frame, a moving means connected to said frame for moving said deposited swaths from said first edge to said second edge, said moving means moving the swaths away from said first edge in a generally horizontal manner and prior to reaching said second edge in an upwardly inclined manner to said second edge, said second edge being generally the highest point above the ground of said moving means, said second edge being spaced above the ground, said second edge defining an obtuse angle with said direction of frame travel, and a turning means for moving said swaths in a direction generally perpendicular to said first direction of travel from said second edge to the ground, said turning means turning said swaths over as said frame moves in said first direction of travel and as said swaths are moved from said second edge to the ground.

21. A swath turning machine comprising:

a frame including a first edge and a second edge, a wheel means rotatably attached to said frame whereby said frame can be moved in a first direction of travel, a pick-up means disposed along said first edge for engaging swaths lying on the ground and depositing said swaths on said frame, a moving means connected to said frame for moving said deposited swaths from said first edge to said second edge, said second edge being spaced above the ground, said second edge defining an obtuse angle with said first direction of travel, a turning means for moving said swaths in a direction generally perpendicular to said first direction of travel from said second edge to the ground, said turning means turning said swaths over as said frame moves in said first direction of travel and as said swaths are moved from said second edge to the ground, and an adjusting means for adjusting the position of said second edge relative to said first direction of travel whereby the angle of said obtuse angle defined by said second edge and said first direction of travel can be varied thereby varying the width of the turned swaths that are moved to the ground.

22. The swath turning machine according to claim 21 including, said moving means moving the swaths between said first edge and said second edge in a direction generally perpendicular to said first direction of travel.

23. A swath turning machine comprising:

a frame including a first edge and a second edge, a wheel means rotatably attached to said frame whereby said frame can be moved in a first direction of travel, a pick-up means disposed along said first edge for engaging swaths lying on the ground and depositing said swaths on said frame, a moving means connected to said frame for moving said deposited swaths from said first edge to said second edge, said moving means including a belt system extending between said first edge and said second edge, said second edge being spaced above the ground, said second edge defining an obtuse angle with said direction of frame travel, and a turning means for moving said swaths in a direction generally perpendicular to said first direction of travel from said second edge to the ground, said turning means turning said swaths over as said frame moves in said first direction of travel and as said swaths are moved from said second edge to the ground.

24. The swath turning machine according to claim 23 including, said moving means moving the swaths between said first edge and said second edge in a direction generally perpendicular to said first direction of travel.

25. The swath turning machine according to claim 23 including, said first edge defining an obtuse angle with said first direction of travel on the opposite side of said first direction of travel as said second edge.

26. The swath turning machine according to claim 23 including,
said first edge and said second edge being positioned in the same horizontal plane.

27. A swath turning machine comprising:
a frame including a first edge and a second edge,
a wheel means rotatably attached to said frame whereby said frame can be moved in a first direction of travel,
a pick-up means disposed along said first edge for engaging swaths lying on the ground and depositing said swaths on said frame,
a moving means connected to said frame for moving said deposited swaths from said first edge to said second edge,
said second edge being spaced above the ground,
said second edge defining an obtuse angle with said direction of frame travel,
a turning means for moving said swaths in a direction generally perpendicular to said first direction of travel from said second edge to the ground, said turning means turning said swaths over as said frame moves to said first direction of travel and as said swaths are moved from said second edge to the ground, and
a folding means for folding said second edge up toward said first edge and about a folding axis disposed generally parallel with said first direction of travel.

* * * * *